United States Patent [19]
Carter et al.

[11] 4,298,301
[45] * Nov. 3, 1981

[54] BALE HANDLING APPARATUS

[76] Inventors: Jackie L. Carter, R.R. 2, Lucerne, Mo. 64655; Jerry D. Carter, 320 S. 19th St., Unionville, Mo. 63565

[*] Notice: The portion of the term of this patent subsequent to Apr. 10, 1996, has been disclaimed.

[21] Appl. No.: 970,917

[22] Filed: Dec. 19, 1978

Related U.S. Application Data

[63] Continuation-in-part of Ser. No. 752,151, Dec. 20, 1976, Pat. No. 4,148,399.

[51] Int. Cl.³ .............................................. B65H 75/40
[52] U.S. Cl. .................................... 414/24.6; 414/739
[58] Field of Search ...................... 414/24.5, 24.6, 729, 414/738, 739, 911; 242/86.5 R; 294/88, 106

[56] References Cited

U.S. PATENT DOCUMENTS

| | | | |
|---|---|---|---|
| 3,637,250 | 1/1972 | Blonsky | 294/106 X |
| 4,049,140 | 9/1977 | Roose | 294/88 X |
| 4,148,399 | 4/1979 | Carter et al. | 414/731 X |

FOREIGN PATENT DOCUMENTS

| | | | |
|---|---|---|---|
| 1299233 | 6/1962 | France | 294/88 |
| 398491 | 3/1974 | U.S.S.R. | 294/106 |

Primary Examiner—Trygve M. Blix
Assistant Examiner—Terrance L. Siemens
Attorney, Agent, or Firm—Lowe, Kokjer, Kircher, Wharton & Bowman

[57] ABSTRACT

The invention related to an apparatus for lifting, handling, transporting and unrolling large round hay bales. Preferably said apparatus is employed on the bed of a pickup or truck and includes a frame mounted on the pickup bed with a beam pivotally mounted thereon and with arms pivotally mounted on the beam. The arms have bale penetrating members mounted or fixed thereon. First power actuated means operably pivot the beam in an arc about the rear end of the pickup toward and away from the ground. Second, power actuated means for pivoting the arms and penetrating members about the ends of the beam toward each other in such fashion as to squeeze a bale sufficiently to allow the first power means to lift the bale from the ground, and to pivot away from each other to release the bale. The bale penetrating members are mounted on the arms to allow a bale to be unrolled or distributed.

4 Claims, 3 Drawing Figures

4,298,301

BALE HANDLING APPARATUS

RELATED APPLICATIONS

This application is a continuation in part of application Ser. No. 752,151 filed Dec. 20, 1976, now U.S. Pat. No. 4,148,399.

BACKGROUND OF THE INVENTION AND OBJECTS

With the advent of the large round balers and stackers it has become necessary for farmers and ranchers to provide powered mechanical means to lift, transport, handle and unroll or distribute hay from the bales and stacks. Various devices have been built and used in an attempt to deal with the large round bales which are four to six feet in diameter, approximately five to six feet in length and usually weight in the range of six hundred to one thousand eight hundred pounds. One of these devices is the widely used "spike" loader which has been in use since mid 1973 and which is comprised of a spike of heavy metal mounted on a hydraulic or winch lift on the rear of a pickup, truck or tractor. The spike is simply pushed by the associated vehicle into the core of a round bale, then lifted by winch or hydraulic mechanism and carried by the vehicle to the place of feeding or storage. The spike concept has further been used on front end loaders (see U.S. Pat. No. 3,921,837). Further, devices such as disclosed in U.S. Pat. No. 3,908,846 provide for squeezing a bale with penetrating members which swing into a bale from hinged mounting positions preparatory to lifting. The latter system further provides for unrolling a bale. A problem with the arrangement is that the design is insufficient to withstand the stresses created during the unrolling of a bale while crossing a ditch or low place. A further device for handling such bales is that shown in U.S. Pat. No. 3,880,305 which provides powered pivotal swing arms with bale penetrating members mounted thereon and with the arms mounted on an upright frame adapted for use on the rear of a tractor.

An additional example of a large bale handler is shown by U.S. Pat. No. 4,044,963 which provides for telescopic arms between which a large bale is squeezed, lifted, lowered, unrolled or carried. Other systems provide for plural lifting/moving means to aid in the accommodation of plural bales on a truck. An example of this system is shown in U.S. Pat. No. 3,820,673.

Accordingly, it is an object of this invention to provide a device for handling of large round bales which is simple, sturdy and reliable in nature.

A further object of this invention is the provision of a large round bale handling device for mounting on the rear of a pickup which may be operated from the pickup driver's seat.

A further object is the provision of a large round bale handling device for mounting on the rear of a pickup which enables the pickup operator, from his seat in the cab, to load and carry away two large round bales per trip.

A further object is the provision of a large round bale handling device which is adapted for use on a pickup and which enables the operator of a pickup from the driver's seat to load, carry away and unload on the ground or into a feeder a large round bale or unroll and distribute the hay from a large round bale.

A further object of the invention is the provision for lifting and transporting a large round bale by the use of power actuated arms mounted on a beam which pivots in an arc about the rear end of the bed of a pickup toward and away from the earth; which beam and arms may be stopped in any position along the arc of movement.

A further object of the invention is the provision for lifting and transporting large round hay bales by the use of power actuated arms pivotally mounted on a beam which pivots in an arc about the end or side of a vehicle toward and away from the earth with said arms being pivotal toward and away from each other about the ends of said beam for grasping and releasing a bale therebetween.

With these objects in view, as well as other objects which will become apparent from the specification, reference will be had to the accompanying drawings wherein.

Figure 3:
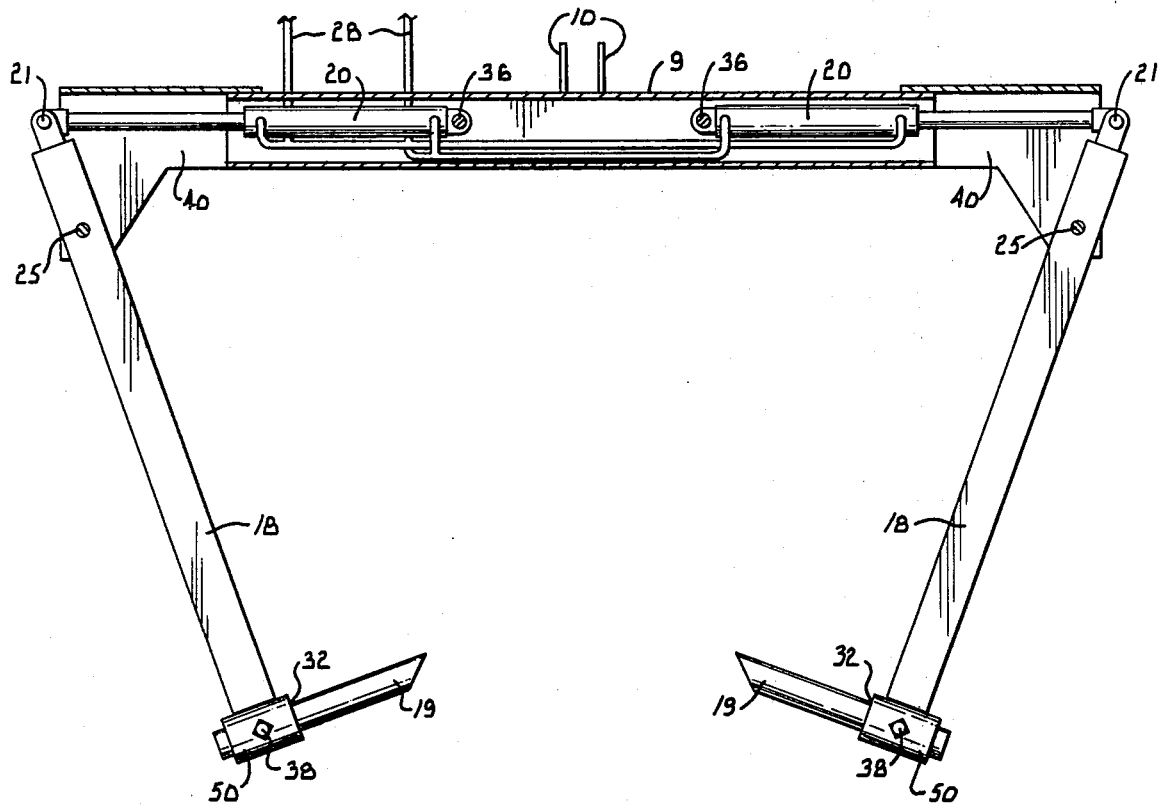

FIG. 3 is a sectional view of beam 9 and associated arms 18 and cylinders 20 of the invention.

DESCRIPTION OF THE PREFERRED EMBODIMENT

Figure 1:
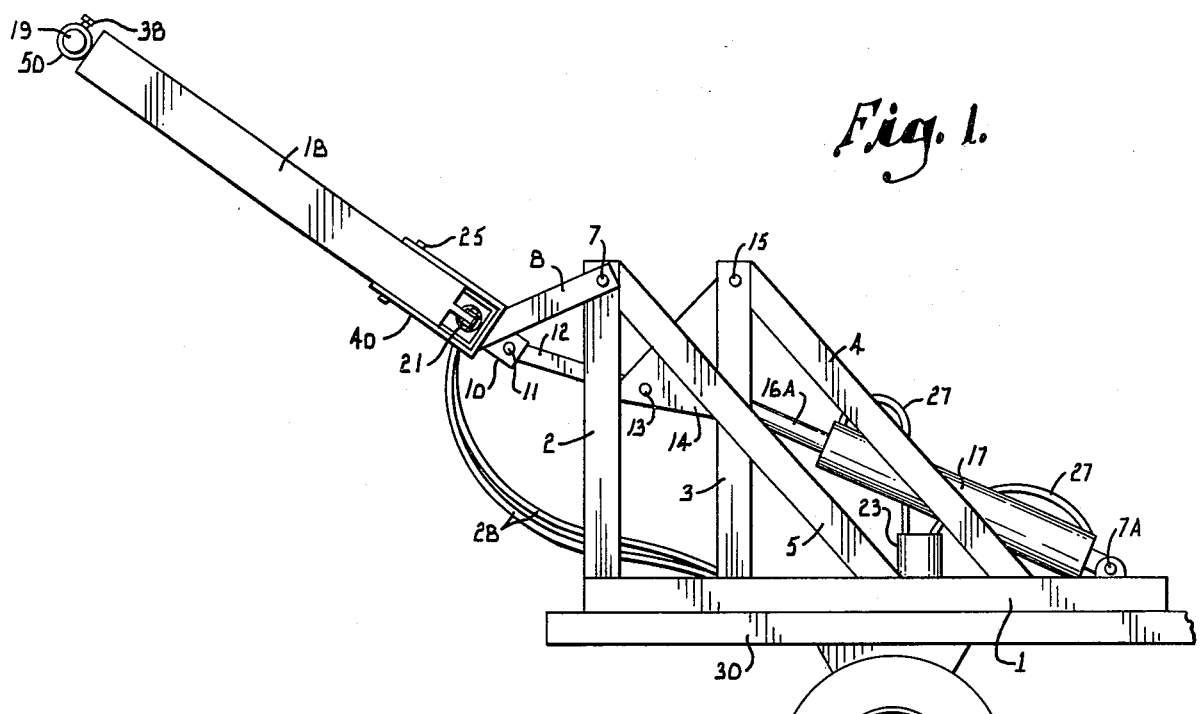
FIG. 1 is a side elevation view of the bale handling apparatus of the present invention mounted on the rear of a pickup or truck bed.
Figure 2:
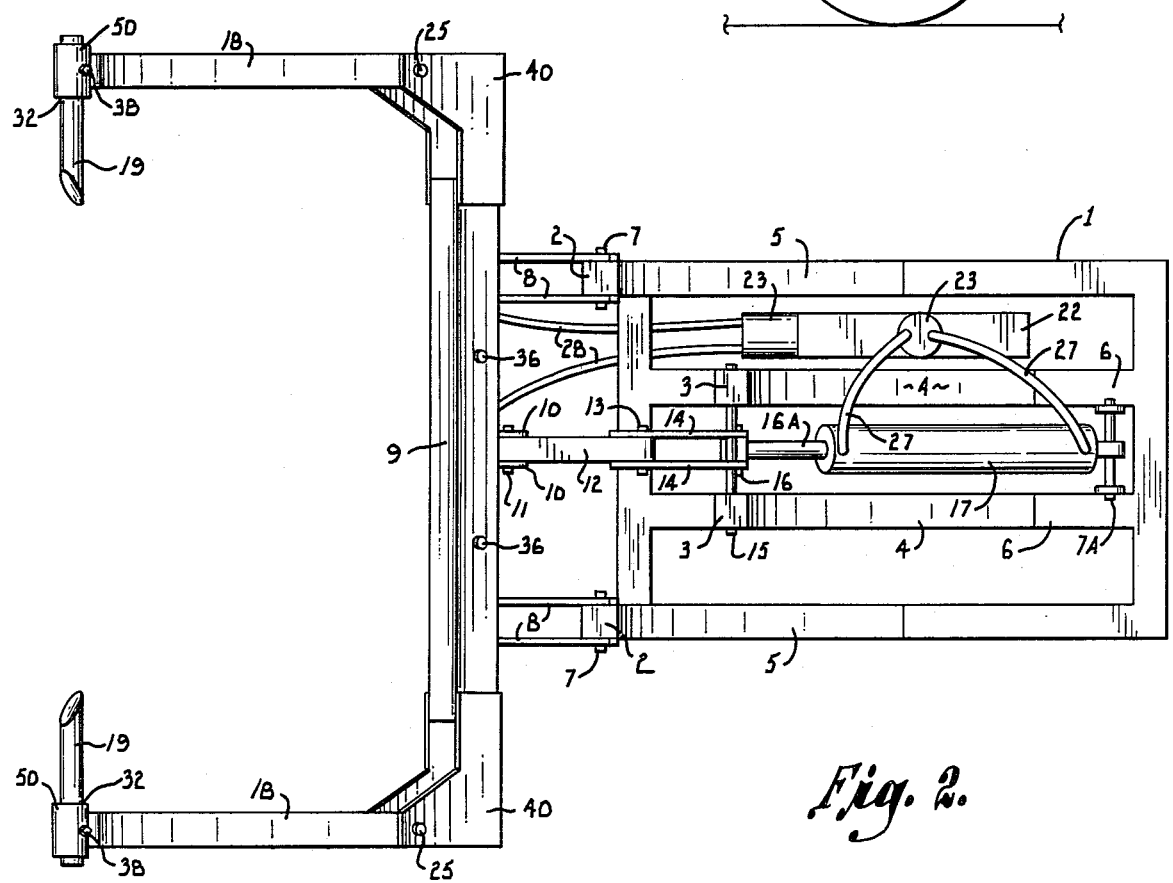
FIG. 2 is a top plan view of the bale handling apparatus alone.

Referring in more detail to the drawings wherein like parts are consistently numbered and wherein there is shown in FIGS. 1 and 2 the preferred embodiment having a frame with a base portion 1 in the form of a rectangle with portions 6 welded there within in a lengthwise manner and which is mounted flat on the rear end of a pickup or truck bed 30. Welded to base 1 and 6 are upright frame portions 2 and 3 which are stabilized by frame braces 4 and 5 of which braces 5 are welded to 1 at the lower end and to frame uprights 2 at the upper end thereof while braces 4 are welded at their lower ends to frame portions 6 which lie flat on the pickup or truck bed and in the plane of 1 with portions 6 being welded at their extremities to rectangle base portion 1 as noted above. The upper ends of braces 4 are welded to the upper ends of uprights 3.

Pivotally mounted by pin connection at 7 on uprights 2 are supports 8 for beam 9 with supports 8 being welded to beam 9.

At the mid-portion of beam 9 are struts 10 welded thereto. Pin connected to 10 at 11 is connecting element 12, the other end of which is pin connected to linkage 14 at 13. Linkage 14 is pivotally mounted at 15 to the top of frame uprights 3. Pin connected to linkage 14 at 16 is the plunger 16A of hydraulic cylinder 17 which has its other end pin connected to frame portion 6 at 7A.

Pivotally mounted on the extremities of beam 9 are arms 18 (not drawn to scale with respect to frame 1 in FIG. 2) on which are mounted spikes 19 for penetration of a large round bale. As best seen in FIG. 3 arms 18 are connected to the plunger ends of hydraulic cylinders 20 via pin connections 21. Cylinders 20 are connected at their opposite ends by pins 36 to the mid-portion of beam 9 and securely held there.

Beam 9 has as extremities thereof L-shaped brackets 40 which are welded thereto or otherwise permanently attached thereto. As noted below beam 9 is preferably 4 inches by 6 inches in cross section and is made of hollow steel. Arms 18 are pivotally mounted by pins 25 on the bracket extremities 40 of beam 9. Cylinders 20 are connected to hydraulic lines 28 as seen in FIG. 3. Set screws 38 tightly hold spikes 19 in cylindrical openings 32 at the ends of arms 18 as seen in FIGS. 1, 2 and 3. Brackets 40 are open on the ends away from beam 9 and on the bale grasping side of beam 9 and closed by side 52 away from the bale grasping side of beam 9. The open sides of brackets 40 allow for arms 18 to pivot in handling bales. Openings 32 which accommodate spikes 19 are preferably in cylindrical shaped tubing 50 which is welded or otherwise secured to the ends of arms 18 as shown in the drawings. Hydraulic lines 28 enter beam 9 through an opening not shown on the side of 9 opposite the bale grasping side thereof.

Hydraulic cylinders 20 and 17 are supplied by an electric motor driven hydraulic pump unit 22 which includes a fluid reservoir. Control of the cylinders 20 and 17 is by solenoid-operated valves 23 which control the direction of flow of pressurized fluid between said cylinders and the motor-pump unit 22. The solenoid-operated valves 23 are each controlled by a separate electric switch (not shown) located in the cab of the pickup/truck on which the invention is employed. The switches operate such that when pushed in one position a circuit is closed to energize 22 and the respective solenoid valve such that pressurized fluid from unit 22 causes the associated cylinder to extend, while in the other switch position, the cylinder via unit 22 and associated valve is caused to retract. The switches, solenoid-operated valves, electric motor-pump unit as well as associated connecting holes and cylinders are all commercially available items which may be purchased from, for example, the Monarch Road Machinery Company in Grand Rapids, Mich.

Frame portions 1, 2, 3, 4, 5 and 6 are made from approximately three inch square cross section hollow steel while beam 9 is approximately 4 inch by 6 inch cross section hollow steel. Arms 18 may be made of hollow or solid steel.

Spikes 19 may be either fixedly mounted to the ends of arms 18 or mounted as within cylindrical openings 32 at the ends of arms 18 and held there by set screws 38 as noted above to prevent lateral movement. In the latter arrangements, spikes 19 are made of a cylindrical form of diameter less than the openings 32 in arms 18. With respect to beam 9, pins 25 are placed there through at the extremities 40 and through holes in arms 18 to provide a pivotal point for arms 18 as they are actuated by cylinders 20.

Spikes 19 which are on the order of six inches to one foot in length as stated above, may be rigidly attached to arms 18. Experience has shown that a bale may be unrolled from the rigidly mounted spikes as well as from those mounted in openings 32 and held by set screws 38.

Cylinder 17 is connected with one of the valves 23 via hydraulic lines 27 while cylinders 20 are connected with one of the valves 23 via hydraulic lines 28.

Motor-pump unit 22 is powered via the above discussed switches not shown from the associated vehicle's electrical system such as, for example, the 12 volt system presently employed on most trucks and pickups.

OPERATION

When the operator desires to move a bale, the vehicle upon which the device of the invention is mounted is backed up to the bale with arms 18 in the position in which their spike ends are pivoted about 25 so as to be widely separated from each other by cylinders 20 under the switch control of the operator. When the carrier vehicle is in position such that spikes 19 can then be positioned by cylinder 17 to a point adjacent the center of the end of a round bale, cylinders 20 are energized via 22 and 23 to pivot arms 18 toward each other and about pivots 25 driving spikes 19 into the core or axis of the round bale. When the operator observes that spikes 19 have penetrated to the extent necessary for supporting a bale, then the operator energizes cylinder 17 via 22 and 23 which pushes linkage 14, connecting element 12 and this beam 9 such as to force the latter in an upward arc carrying the bale which is supported via 19. The beam 9 may be positioned for carrying a bale at any point from that sufficient to lift a bale off the ground or other resting place to a position forward of vertical. An advantage of the invention is that one bale may be raised by arms 18 and spikes 19 via cylinder 17 to a position forward of 17 in the pickup or truck bed and deposited there i.e., a bale is picked up by 18 and 19 swung in an upward arc past the vertical position of 18 to a point where the lifted bale comes to rest on the truck/pickup bed forward of cylinder 17 and base 1. The bale is then released by the pivoting apart of 18 about 25 by cylinders 20 after which another bale is grasped by arms 18 and spikes 19 and lifted such that it leaves the ground.

Thus, at least two bales may be carried per trip on the vehicle on which the invention is mounted.

Upon arrival where the bales are to be deposited, the operator may either unload both bales by operating the device in reverse order to that of loading or may unroll one or more of the bales by lowering a bale clutched between 18 on spikes 19 to the point when the bale just touches the ground. The operator then slowly drives the vehicle forward while gently lowering arm 18 as the bale unrolls. This is, of course, continued until all the bale is unrolled to facilitate animal feeding.

Arms 18 may, of course, be pivoted toward or away from each other by power means other than two hydraulic cylinders such for example as by one long hydraulic cylinder or by power drive threaded shaft extending through threaded receivers in arms 18 such that as the threaded shaft is turned in one direction, the ends of arms 18 closest to beam 9 are drawn together while being separated when the screw is driven in the opposite direction. Further, a cable drive could be employed to pivot arms 18 about 25 using the principal employed to draw draperies apart and together. Likewise, beam 9 could be operated by a constantly tensioned cable arrangement or power driven screw arrangement.

While the device has been described as operating from the rear of a pickup or truck, it could, of course, be operated on the front or side of any vehicle adapted or adaptable for the carrying of large hay bales, all within the purview of the invention.

What we claim and desire to protect by Letters Patent is:

1. A device for handling large round hay bales comprising:
   (a) frame means mounted on the bed of a vehicle wherein said frame means comprises:
      (1) a base portion mounted on said bed;
      (2) a first and second plurality of upright portions mounted on said base portions and extending well above said bed and base portion;
   (b) an elongated beam means pivotally mounted on said first plurality of upright portions in a horizontal relationship with respect to the earth; said beam means being mounted such that it may move along an arcuate path toward and away from the earth and about the pivotal mounting points on said upright portions;
(c) first power actuated means pivotally connected at one end to said frame means;
(d) linkage means pivotally mounted on said second plurality of upright portions of said frame and connected to the other end of said first power actuated means;
(e) connecting means connected to said linkage means and to said beam means;
(f) plural arm means pivotally mounted on said beam means;
(g) second power actuated means connected to said plural arm means for pivoting the ends of said plural arm means toward and away from each other, said second power actuated means being mounted in approximately parallel relation to and inside of said beam means;
(h) spike means mounted on the said arm means in perpendicular relationship to said arm means such that as ends of said arm means pivot toward each other with a hay bale therebetween, said spike means will engage, deform and penetrate said hay bale to enable the lifting thereof by said first power actuated means acting through said arm means, beam means, connecting means and linkage means.

2. A device for handling hay bales comprising:
(a) frame means adapted for mounting on a vehicle;
(b) first and second uprights extending generally upwardly from said frame means;
(c) a beam pivotally coupled with said first upright for movement in an arc about a generally horizontal pivot axis;
(d) linkage means pivotally mounted on said second upright;
(e) connecting means connecting a first point of said linkage means to said beam in a manner to effect movement of the beam in an arc about said pivot axis in response to pivotal movement of said linkage means relative to said second upright;
(f) first power actuated means for effecting arcuate movement of said beam, said first power actuated means having one end connected with said frame means and another end pivotally connected to a second point of said linkage means;
(g) a pair of arms pivotally mounted on said beam, each arm having a first end and a second end;
(h) second power actuated means for pivoting said first ends of said arms generally toward and away from one another; and
(j) friction means on said first end of each arm for deforming the bale as said first ends of the arms are pivoted toward each other with the bale located therebetween.

3. The device of claim 2, wherein said second end of each arm is connected with said second power actuating means, each arm being pivotally connected to said beam at a point intermediate the first and second ends of the arm.

4. The device of claim 2 wherein said second power actuated means is connected to said arm and is mounted in approximately parallel relationship to and inside of said beam.

* * * * *